No. 659,023. Patented Oct. 2, 1900.
G. H. GENTZEL.
APPAREL BELT.
(Application filed July 19, 1900.)
(No Model.)
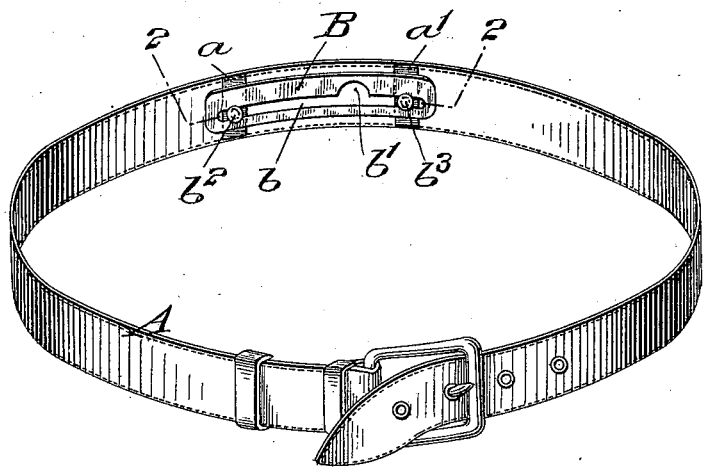
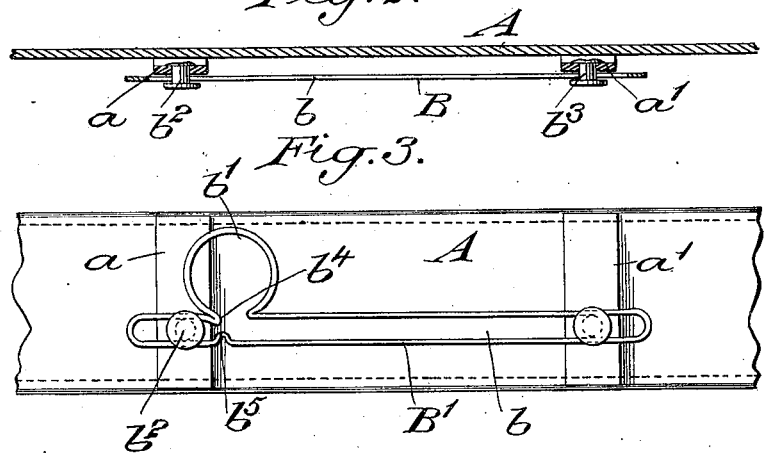
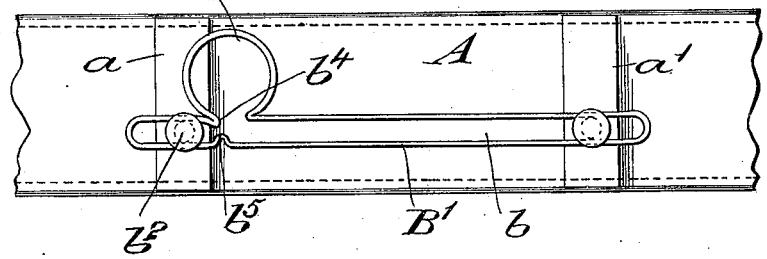
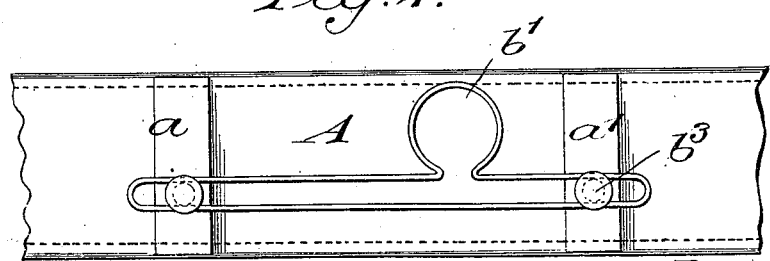
Witnesses:
George Barry Jr
Edward Vieser
Inventor:
Gustav H Gentzel
by his atty

UNITED STATES PATENT OFFICE.

GUSTAV H. GENTZEL, OF JERSEY CITY, NEW JERSEY, ASSIGNOR TO THE JOHN MEHL & COMPANY, OF SAME PLACE.

APPAREL-BELT.

SPECIFICATION forming part of Letters Patent No. 659,023, dated October 2, 1900.

Application filed July 19, 1900. Serial No. 24,135. (No model.)

*To all whom it may concern:*

Be it known that I, GUSTAV H. GENTZEL, a citizen of the United States, and a resident of Jersey City, in the county of Hudson and State of New Jersey, have invented new and useful Improvements in Apparel-Belts, of which the following is a specification.

My invention relates to certain improvements in apparel-belts, and has for one object to provide a belt with a new and improved device for detachably connecting the belt with a button on the waistband of a skirt or other article of apparel, the said device having a limited sliding movement lengthwise of the belt, so as to permit the ready attachment and removal of the button and so as not to interfere in any respect with the set of the belt when engaged with the button.

A further object is to provide a very cheap and simple construction which will successfully withstand the great strains to which supporting-belts of this character are subjected.

A practical embodiment of my invention is represented in the accompanying drawings, in which—

Figure 1 represents a perspective view of a belt with my improved waist-button-attaching device applied thereto. Fig. 2 is an enlarged longitudinal horizontal section through a portion of the belt and the attaching device, taken in the plane of the line 2 2 of Fig. 1. Fig. 3 is a detail view of a portion of the inside of a belt with a modified form of my attaching device, and Fig. 4 is a similar view of a third form of attaching device.

The belt is denoted as a whole by A, and it may be of any suitable style, shape, and material. A pair of cross-straps $a$ $a'$ are secured to the inside of the belt, at the back thereof, these cross-straps being preferably secured to the belt at their opposite ends only.

In the form of attaching device shown in Figs. 1 and 2 the device is shown as comprising a flexible strip or plate B, of metal or other suitable material, and it is provided with an elongated slot $b$, extending lengthwise therein, for receiving the shank of a waist-button. (Not shown herein.) This device B is further provided with a button-receiving opening $b'$, communicating with the slot near one end thereof, the said opening $b'$ being of a size sufficient to permit the ready insertion of the button therethrough without bending or displacing any portion of the device. The device is permitted a limited longitudinal sliding movement with respect to the belt by providing rivets $b^2$ $b^3$, the shanks of which pass through the elongated slot $b$ in the belt, the said rivets being secured to the cross-straps $a$ $a'$, respectively. The rivets pass through the slot $b$ in close proximity to the ends thereof, although the attaching device is permitted only a slight longitudinal sliding movement in either direction. However, the belt may be buckled outwardly a considerable distance by sliding one of the rivets—$b^3$, for example—inwardly along the slot, while the other end of the device is held against movement with respect to the belt.

In the form shown in Fig. 3 the button-attaching device is shown as being composed of skeleton form. The longitudinal portions of the wire in this form B' of the device are brought together, as shown at $b^4$ $b^5$, adjacent to the portion of the wire which forms the loop or opening $b'$, so as to form a guide for facilitating the ready insertion and removal of the waist-button. The device shown in Fig. 4 is also of skeleton form, the opening $b'$ being located at a point only a slight distance away from the middle portion of the device.

By the use of the device hereinabove described, which is provided with both a button-shank-receiving elongated slot and a button-receiving opening communicating therewith, I am enabled to readily insert and remove the waist-button without spreading the device. Furthermore, by permitting the device and the belt to have a limited sliding movement with respect to each other I am enabled to bend the belt immediately adjacent to the device outwardly quite a distance to still further facilitate the insertion and removal of the waist-button. When the button has been inserted in its position between the device and the back of the belt, the belt may be drawn snugly around the body of the wearer, and the said belt will preserve its shape even at the point of attachment of the button thereto, both because of the sliding engagement of the attaching device with the belt and because the cross-straps $a\ a'$ serve to space the attaching device a distance inwardly from the belt substantially equal to the thickness of the waist-button.

It is evident that changes might be resorted to in the form and arrangement of the several parts without departing from the spirit and scope of my invention. Hence I do not wish to limit myself strictly to the structure herein set forth; but

What I claim is—

1. The combination with a belt, of a waist-button-attaching device having an elongated button-shank-receiving slot therein and a button-receiving opening communicating with the said slot, and means for loosely securing the device to the belt, comprising rivets passing through the said slot and secured to the said belt, substantially as herein set forth.

2. The combination with a belt having a pair of cross-straps spaced apart and secured thereto, of a waist-button-attaching device having an elongated button-shank-receiving slot therein and a button-receiving opening communicating with the said slot, and means for loosely securing the device to the belt comprising rivets passing through the said slot and secured to the said cross-straps, substantially as set forth.

In testimony that I claim the foregoing as my invention I have signed my name, in presence of two witnesses, this 13th day of July, 1900.

GUSTAV H. GENTZEL.

Witnesses:
JOHN M. KELLEY,
HENRY MEHL.